(12) United States Patent
Romano et al.

(10) Patent No.: US 10,573,275 B2
(45) Date of Patent: *Feb. 25, 2020

(54) TECHNIQUES FOR DETERMINING AN ADJUSTMENT FOR A VISUAL OUTPUT

(71) Applicant: INTEL CORPORATION, Santa Clara, CA (US)

(72) Inventors: Jacky Romano, Pardes Hana (IL); Travis T. Schluessler, Berthoud, CO (US); Guy Zadicario, Kfar Saba (IL); Stas Gurtovoy, Benel Brak (IL); Liran Bachar, Nes Ziyona (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/902,340

(22) Filed: Feb. 22, 2018

(65) Prior Publication Data
US 2018/0286353 A1 Oct. 4, 2018

Related U.S. Application Data

(63) Continuation of application No. 14/061,174, filed on Oct. 23, 2013, now Pat. No. 9,940,904.

(51) Int. Cl.
*G09G 5/18* (2006.01)
*G06F 3/14* (2006.01)
*G09G 5/36* (2006.01)

(52) U.S. Cl.
CPC ............ *G09G 5/18* (2013.01); *G06F 3/14* (2013.01); *G09G 5/36* (2013.01); *G09G 2320/103* (2013.01); *G09G 2330/021* (2013.01); *G09G 2340/0435* (2013.01); *G09G 2360/16* (2013.01)

(58) Field of Classification Search
CPC ... G06T 7/136; G06T 5/50; G09G 2340/0435; G09G 2320/103; G09G 2360/16
See application file for complete search history.

(56) References Cited

U.S. PATENT DOCUMENTS

2006/0146056 A1* 7/2006 Wyatt ............... G09G 5/006
345/501

OTHER PUBLICATIONS

Seelam et al., :A Hysteresis Based Approach for Quality, Frame Rate, and Buffer Management for Video Streaming Using TCP E.S. Al-Shaer and G. Pacifici (Eds.): MMNS 2001, LNCS 2216, pp. 1-15, 2001. © Springer-Verlag Berlin Heidelberg 2001 (Year: 2001).*

* cited by examiner

*Primary Examiner* — Antonio A Caschera

(57) ABSTRACT

Various embodiments are generally directed to an apparatus, method and other techniques for receiving image information for a current frame, determining an amount of change between the current frame and a previous based on the image information for the current frame and image information for a previous frame and determining an adjustment of a frame time based on the amount of change between the current frame and the previous frame.

25 Claims, 9 Drawing Sheets

TECHNIQUES FOR DETERMINING AN ADJUSTMENT FOR A VISUAL OUTPUT

CROSS-REFERENCE TO RELATED APPLICATIONS

This application is a continuation of, claims the benefit of and priority to previously filed U.S. patent application Ser. No. 14/061,174 filed Oct. 23, 2013, entitled "TECHNIQUES FOR DETERMINING AN ADJUSTMENT FOR A VISUAL OUTPUT", which is hereby incorporated by reference in its entirety.

BACKGROUND

Many existing applications generate visual graphics and update the visual graphics on a screen or display in a constant or high-as-possible rate regardless of the contribution of the actual frame rate to the delivered visual quality. More specifically, a constant frame rate or time frame may be used even when the visual graphics on the display have a relative low amount of change from one frame to the next frame where a lower frame rate would not degrade a user's experience. Thus, a large amount of power is wasted while processing these visual graphics on the display at these constant frame rates or time frames. In today's world, with more and more devices running on battery power, this wasted power shortens the battery life without any added advantage to the user of the device.

DETAILED DESCRIPTION

Figure 1:
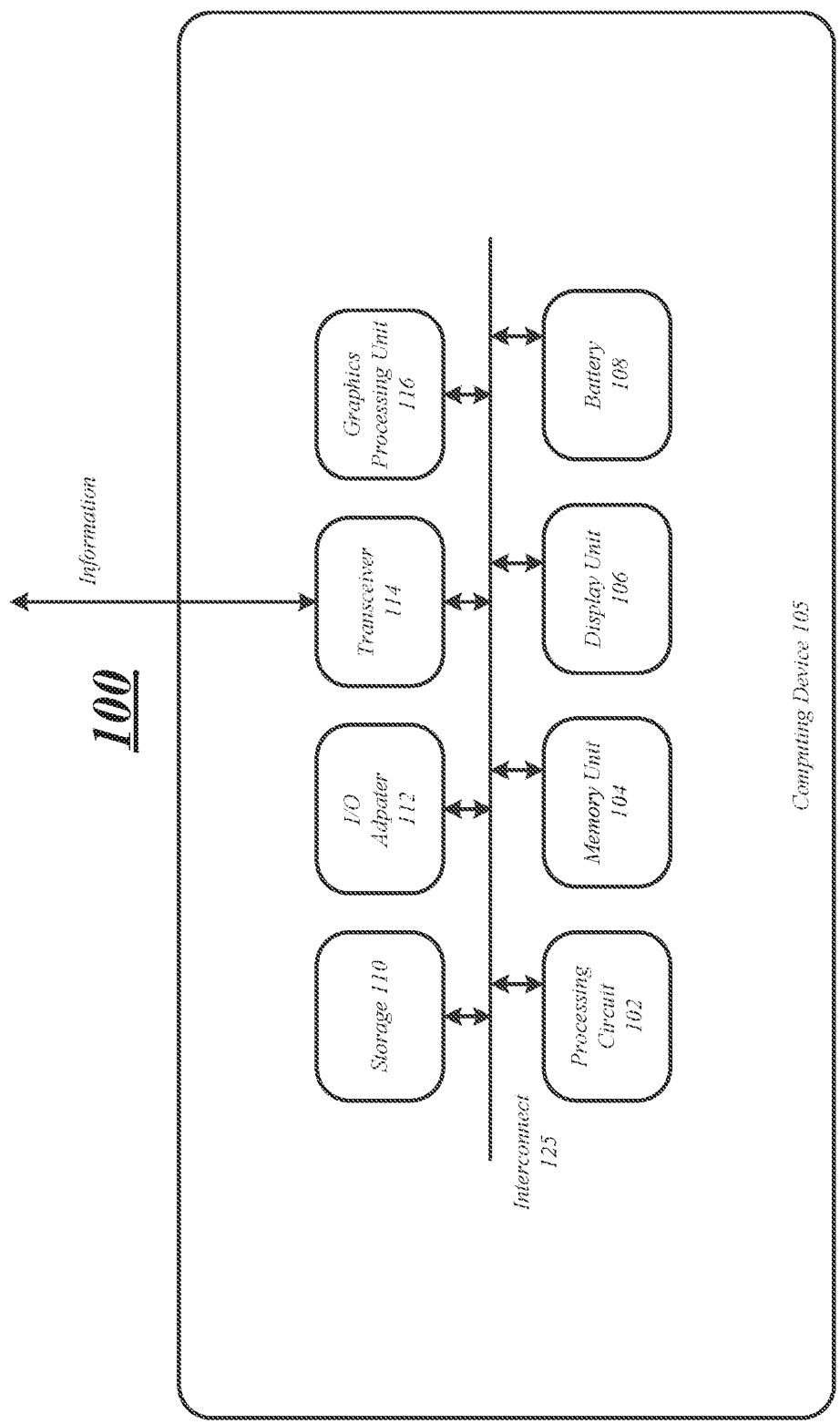
FIG. 1 illustrates an embodiment first computing system.

Various embodiments are generally directed to determining an amount of change between a current frame of visual graphics displayed on a display and a previous frame of visual graphics displayed on the display and adjusting a frame rate and/or time frame based on the amount of change. The amount of change may be based on comparing luminance values of pixels of the current frame with luminance values of pixels of the previous frame at corresponding locations. However, various embodiments are not limited in this manner and the amount of change may be determined based on other information such as pixel color information, hue information, shader information, pixel information, etc.

The amount of change between frames may then be used to determine whether an adjustment to a time frame and/or a frame rate is beneficial to a user by reducing power consumption without degrading a user's experience on the device below an acceptable level. First, a determination may be made as to whether an adjustment to the time frame or frame rate will have any adverse effects on the user's experience and whether to enable the adjustment. In addition, the amount of change may be used to determine whether to increase, decrease or keep the frame rate and/or time frame the same based on a comparison between the amount of change and a perceived quality threshold. The perceived quality threshold may be set such that the frame rate and/or frame time is maintained at an acceptable level for a user. For example, the perceived quality threshold may be set at a low value if the user wants to maintain a high frame rate (low frame time) even when small changes in frames are detected. On the other hand, the perceived quality threshold may be set to a high value if some degradation of visual quality is acceptable to the user.

In some embodiments, if the amount of change between frames is small and less than the perceived quality threshold, the frame rate may be reduced without a user experiencing any degradation in visual quality or degradation to an acceptable level. One example would be while displaying a menu screen of a gaming application; the frame rate may be reduced without a user noticing any or a minimum amount of visual changes with the display. By reducing the frame rate (or increasing the time frame), a computer system may process less data and may save power and battery life. These and other advantages will become more apparent in the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of a computing system, in particular, computing system 105. In various embodiments, computing system 105 may be representative of a computing system suitable for use with one or more embodiments described herein, such as, logic flow 300 of FIG. 3, logic flow 400 of FIG. 4, logic flow 500 of FIG. 5 and logic flow 600 of FIG. 6. The embodiments are not limited in this respect.

As shown in FIG. 1, computing system 105 may include multiple elements. One or more elements may be implemented using one or more circuits, components, registers, processors, software subroutines, modules, or any combination thereof, as desired for a given set of design or performance constraints. Although FIG. 1 shows a limited number of elements in a certain topology by way of example, it can be appreciated that more or less elements in any suitable topology may be used in computing system 105 as desired for a given implementation. The embodiments are not limited in this context.

In various embodiments, computing system 105 may include a processing component 102. Processing component 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor, processing circuitry, or processing circuit on a single chip or integrated circuit. The processing component 102 may be connected to and communicate with the other elements of the computing system via an interconnect 125, such as one or more buses, control lines, and data lines.

In one embodiment, computing system 105 may include a memory unit 104 to couple to processing component 102. Memory unit 104 may be coupled to processing component 102 via interconnect 125, or by a dedicated communications bus between processing component 102 and memory unit 104, as desired for a given implementation. Memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory unit 104 can store data momentarily, temporarily, or permanently. The memory unit 104 stores instructions and data for computing system 105. The memory unit 104 may also store temporary variables or other intermediate information while the processing component 102 is executing instructions. The memory unit 104 is not limited to storing the above discussed data; the memory unit 104 may store any type of data.

In various embodiments, computing system 105 may include a display unit 106. Display unit 106 may constitute any display device capable of displaying information received from processing component 102. The display unit 106 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. The display unit 106 may display a User interface (UI) or a Graphical User Interface (GUI) associated with controlling functionality of the computing system 105. The computer device may include two or more display units, according to various embodiments. For example, in one embodiment, the computing device may include two LCD displays.

In various implementations, computing system 105 may include a battery 108. The battery 108 may be any type of battery to store power for the computing system 105 including, but not limited to, a lithium ion battery, a nickel cadmium battery, zinc chloride battery, or the like. The battery may be rechargeable. In some embodiments, the computing system 105 may have more than one battery. In some embodiments, the battery may be removable. In other embodiments, the battery may be fixed.

In various embodiments, computing system 105 may include storage 110. Storage 110 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 110 may include technology to increase the storage performance enhanced protection for valuable digital media when multiple hard drives are included, for example. Further examples of storage 110 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Computing system 105 may include one or more I/O adapters 112, in some embodiments. Examples of I/O adapters 112 may include Universal Serial Bus (USB) ports/adapters, IEEE 1394 Firewire ports/adapters, and so forth. The embodiments are not limited in this context.

In various embodiments, computing system 105 may include a transceiver 114. Transceiver 114 may include one or more radios capable of transmitting and receiving signals and information using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 114 may operate in accordance with one or more applicable standards in any version. The embodiments are not limited in this context.

Computing system 105 may include a graphics processing unit (GPU) 116, in various embodiments. The GPU 116 may include any processing unit, logic or circuitry optimized to perform graphics-related operations as well as the video decoder engines and the frame correlation engines. The GPU 116 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 116 may process any type of graphics data such as pictures, videos, programs, animation, 3D, 2D, and so forth.

Figure 2:
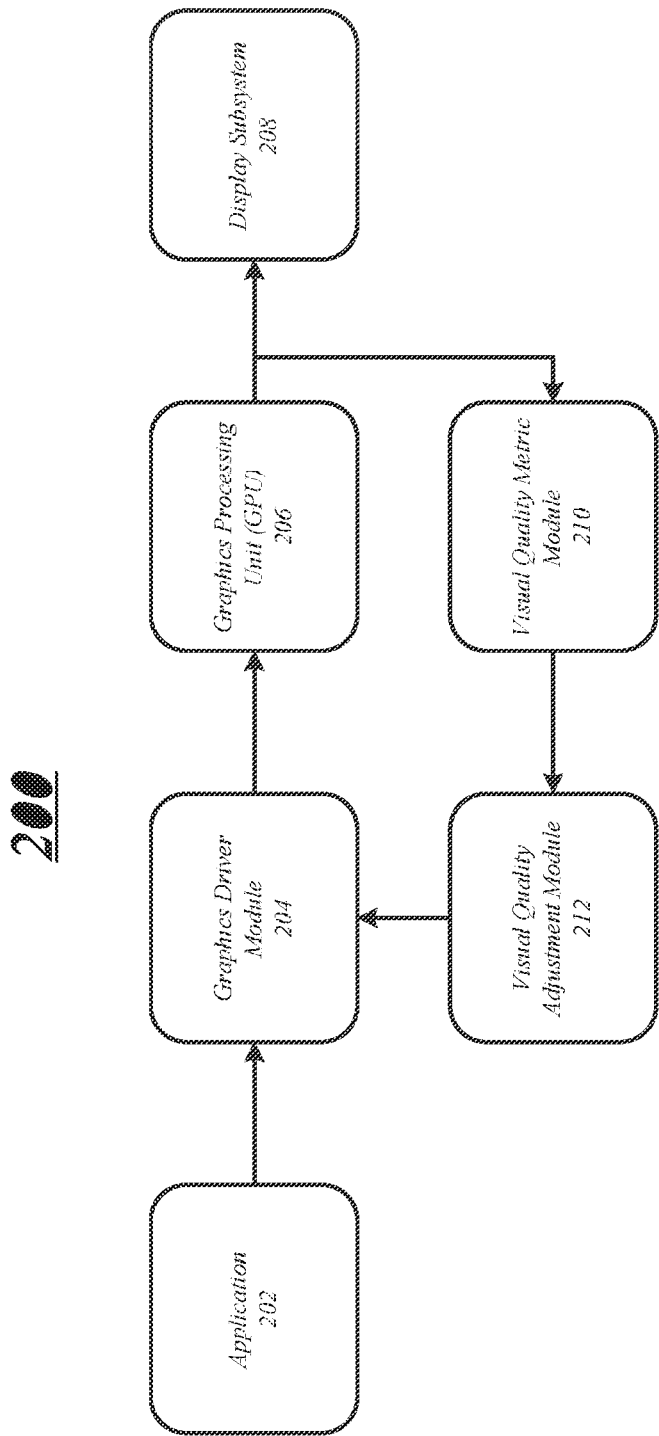
FIG. 2 illustrates an embodiment of a first block diagram for processing graphics.

FIG. 2 illustrates a first block diagram of system 200 for processing graphics and adjusting a visual output. As shown in FIG. 2, system 200 may include multiple modules and elements for processing graphics and graphics-related operations. In various embodiments, system 200 may include application 202, graphics driver module 204, graphics processing unit 206, display subsystem 208, visual quality metric module 210 and visual quality adjustment module 212. The modules and elements of system 200 may communicate with each other via one or more software and/or hardware interconnects, such as one or more buses, traces, pathways, and so forth. The various modules and elements may communicate information with each other via any software communication method, such as a message, a HTML message, an XML message, a call, a function call, middleware, Common Object Request Broker Architecture (CORBA), etc.

System 200 may not be limited to these specific modules and elements shown in FIG. 2. For example, system 200 may include any number of modules and elements to process graphics and graphics-related operations. In various embodiments, certain modules and elements of system 200 may operate on or in conjunction with computing system 105. For example, the modules and elements of system 200 may be stored in memory 104 and processed by processing component 102.

Application 202 may be any type of application or software. In various embodiments, application 202 may be enterprise software, accounting software, office suites, graphics software, gaming software, media software, web-based application, computer system software, educational software, simulation software, content access software, media development software, product engineering software, and so forth. Application 202 is not limited in this manner; application 202 may be any type of application or software for processing data on a computing system.

Graphics driver module 204 may be any type of graphics driver software that that provides and interface between graphics hardware and software operating on system 200. For example, graphics driver module 204 may provide an interface for and enable communication between the graphics processing unit (GPU) 206 and the other modules and elements of system 200. However, graphics driver module 204 is not limited in this manner. For example, graphic driver module 204 may enable communication between the graphics processing unit 204 and an operating system (not shown) operating on system 200. In various embodiments, graphics driver module 204 may receive function calls from application 204 executing on the computing system 105. The graphics driver module 204 may also route the function calls to the GPU 206 so that graphics may be rendered by the GPU 206. In various embodiments, the graphics driver module 204 may be stored in memory 104 and processed by processing component 102. However, the graphics driver module 204 is not limited in this manner. The graphics driver module 204 may be stored in any type storage device and may be processed by any type of processing device.

In various embodiments, the graphics driver module 204 may be a user mode driver. A user-mode driver runs in the non-privileged processor mode in which other application code, including protected subsystem code, executes. However, various embodiments are not limited in this manner; graphics driver module 204 may be a conjunction of a user mode driver and a kernel mode driver working together. A kernel mode driver runs as part of the operating system's executive, the underlying operating system component that supports one or more protected subsystems.

The graphics driver module 204 may also be used to set a frame rate or frame time for processing each frame of a video stream. The frame rate is the frequency (rate) at which graphics system 200 processes unique consecutive images called frames. Frame rate is often expressed in frames per second (FPS). Frame time is the inverse of the frame rate and is the amount of time to process one frame. Thus, as the frame time increases, the frame rate decreases and vice versa. Frame time may be expressed in any unit of time such as microseconds, milliseconds, seconds, minutes, etc.

Graphics processing unit (GPU) 206 may be any type of processing circuit for processing graphics. GPU 206 may contain multiple processing units that concurrently perform independent operations. GPU 206 may implement a number of graphics primitive operations for processing tasks received from an application. In various embodiments, the GPU 206 may process any type of graphics tasks, including but not limited to, drawing, texturing, rendering 3-dimensional (3-D) graphics, rendering 2-dimensional (2-D) graphics, matrix computations and vector computations.

In various embodiments GPU 206 may render information such as frame data, color data, etc. For example, GPU 208 may receive the frame data from one or more applications such as application 202. GPU 206 receives frame data, e.g., all or in part generated by an application running on the processing component 102. GPU 206 may then render the frame data to generate rendered frames (e.g., files of digital pixel information corresponding to all or part of a video frame or graphic) that can be provided to the display subsystem 208 and a display device such as display unit 106. However, GPU 206 is not limited in this manner. GPU 206 may process any type of graphical information received from an application or the operating system.

In some embodiments, system 200 may include display subsystem 208. The display subsystem 208 is responsible for controlling the actual display such as display 106. In various embodiments, the display subsystem 208 may maintain and process information such as the framebuffer address, and the width, height, stride, and pixel format of the frame. In addition, the display subsystem 208 may retrieve pixels for a frame, in a raster order (i.e. left-to-right and top-to-bottom) from memory and send them to the display for displaying. The display unit 106 may receive the pixels from the display subsystem 208 and display them on the display.

Visual quality metric module 210 may evaluate frames of a graphics processing stream and determine an amount of change between frames in the stream. Although, FIG. 2 illustrates visual quality metric module 210 as separate from the graphics driver module 204 and GPU 206, in some embodiments, the visual quality metric module 210 may be part of or implemented in either the graphics driver module 204 or GPU 206 or both. The visual quality metric module 210 may be implemented in hardware, software or combination thereof.

The visual quality metric module 210 may receive image information for each of the frames from the GPU 206 as the image information is sent to the display subsystem 208 for outputting to a display. The output of the GPU 206 may be a bitmap of pixels including image information for each of the pixels. The image information may include pixel color information including pixel color channel information for one or more channels of a pixel, hue information, luminance values, etc. for each of the pixels for displaying the frame to the display. In some embodiments, the image information may also include vertex information, shader information, tessellation information, frame information. The visual quality metric module 210 may then compare the current frame with a previous frame to determine an amount of change. In some embodiments, the previous frame may be the frame that immediately preceded the current frame, however; various embodiments are not limited in this manner and the previous frame may be any previous frame of the current frame. Image information for each of the frames may be stored in memory or storage to use during the comparison between the current frame and the previous frame.

In some embodiments, the visual quality metric module 210 may compare image information or information determined from the image information for each of the pixels within the frame on a per pixel basis. In some embodiments, the visual quality metric module 210 may compare pixel color information for each pixel of the current frame with pixel color information of the previous frame. For example, the pixel color information may include pixel color channel values for one or more channels such as red, green, blue and alpha (RGBA) channels of the pixels. The visual metric module 210 may compare the absolute values of the pixel color information for each of the pixels of the current frame with the absolute values of the pixel color information of pixels from a previous frame at the same pixel location. Various embodiments, are not limited to comparing pixel color information for four channels, pixel color information for any number of channels may be compared to determine a change in between the current frame and the previous frame.

In some embodiments, the visual quality metric module 210 may compare the luminance values for each pixel of the current frame with corresponding luminance values for each pixel of the previous frame at the same location. Thus, a one-to-one comparison is made to determine an amount of change for each pixel compared to the previous pixel. However, comparing every current pixel to a previous pixel may be time consuming and resource inefficient. In some embodiments, the luminance values may be determined from pixel color information in the image information.

In various embodiments, the visual quality metric module 210 may sample pixels of the bitmap and use a subset of the pixels to determine an amount of change. For example, the visual quality metric module 210 may define a sample bitmap size of M×M regular grid and only selects one pixel out of every M×M pixels from the original bitmap to generate a new bitmap. The resulting bitmap will be a grid with the size of W/M×H/M, wherein W is width of the original bitmap and H is the height of the original bitmap. Various embodiments are not limited to this example; the visual quality metric module 210 may select other sampling patterns such as sampling a particular area of the display.

Once the pixels for comparison are determined, the visual quality metric module 210 may then convert pixel color information of the image information into a luminance value for each of the pixels in the sampling or entire frame. For example, red, green, blue and alpha (RGBA) information for each of the pixels may be converted into a luminance value or perceived brightness value. In some embodiments, the visual quality metric module 210 is not limited to converting RGBA information to luminance values and may convert all color channels to luminance values.

In various embodiments, the visual quality metric module 210 may compare the luminance values for each pixel of the current frame with the luminance values for each pixel of the previous frame to determine a normalized difference between each pixel. In some embodiments, equation 1 may be used to determine the normalized difference; however, other embodiments may include other methods to determine the normalized difference.

$$NDiff = abs(Pi - Pi-1)/(Pi-1+1) \quad (1)$$

where NDiff is the normalized difference between the current pixel and a previous pixel at a location,
Pi is current frame pixel luminance value,
Pi-1 is the previous frame pixel luminance value, and
abs is the absolute value function.

In some embodiments, the normalized difference values for each of the pixels may be stored in a bitmap the same size as the sampling bitmap size. However, the normalized difference values may also be stored in any other manner such as in an array or buffer.

The normalized difference values for each of the pixels may be used to determine a maximum average normalized difference value for the entire bitmap as the amount of change between the current frame and the previous frame. The maximum average normalized difference value may be based on averaging all of the normalized difference values for each of the pixels divided by the total number of pixels for the frame.

The maximum average normalized difference value may also be determined by dividing the sampling bitmap into one or more regions and averaging the normalized difference values for pixels in each of the regions to determine an average normalized difference region value for each of the regions. One advantage to divide the bitmap into one or more regions is to increase the detection local sensitivity of the normalized difference function. The average normalized difference region values may be based on a sequence of bitmap subsampling operations until the desired number of regions has been reached. For example, the visual quality metric module 210 subsamples the bitmap into a new 1/2W×1/2H bitmap by averaging 2×2 pixels into a single value for each iteration of the subsampling. The maximum average normalized difference value is the maximum average normalized difference region value. The maximum average normalized difference value may then be used in a comparison with a perceived quality threshold, as will be discussed in more detail below.

The system 200 may also include a visual quality adjustment module 212 to enable adjusting a time frame or frame rate and to adjust the time frame and/or frame rate. Although, FIG. 2 illustrates the visual quality adjustment module 212 as separate from the graphics driver module 204 and GPU 206, in some embodiments, the visual quality adjustment module 212 may be part of or implemented in either the graphics driver module 204 or GPU 206 or both. The visual quality adjustment module 212 may be implemented in hardware, software or combination thereof.

In various embodiments, the visual quality adjustment module 212 may first determine whether to enable an adjustment to the frame time and/or frame rate based on one or more criteria. For example, an adjustment may not occur if the visual quality adjustment module 212 determines that the adjustment will degrades (at all or below an acceptable level) a user's experience while interacting with the computing device. The visual quality adjustment module 212 may disable or prevent an adjustment for a predefined time period such as a number of seconds or a predefined number of frames. The predefined time period may be any time period and the predefined number of frames may be any number of frames.

The one or more criteria may include determining whether visual quality adjustment processing overhead is larger than an amount of savings in system power. This criterion may be based on graphics processing unit (GPU) utilization while processing visual quality adjustment being below a predetermined savings threshold. Another criterion may be determining whether the visual quality adjustment processing overhead will degrade overall system performance. This criterion may be based on the GPU utilization while processing the visual quality adjustment being above a performance threshold. A third criterion may be determining whether a power savings opportunity has occurred over a number of frames. For example, if no adjustment has been made over a number of predetermined frames, the visual quality adjustment module 212 may disable processing for a time period or a number of frames, as previous discussed. In a fourth criterion, the visual quality adjustment module 212 may determine if latency due to GPU utilization degrades the user experience below a defined latency threshold. The defined latency threshold may be a user defined latency threshold or a default defined latency threshold to limit an amount of latency such that are not delays in response to user inputs.

The visual quality adjustment module 212 may adjust the frame rate via adjusting the frame time for each of the frames. As previously discussed the frame rate and frame time are inversely related, as the frame time increases, the frame rate decreases and vice versa. In various embodiments, the visual quality adjustment module 212 may adjust the frame time based on the amount of change between the current frame and the previous frame.

As previously discussed, the visual quality metric module 210 may determine the maximum average normalized difference value as a representation of the difference between the current frame and the previous frame. The maximum average normalized difference value may then be compared to a perceived quality threshold value. The perceived quality threshold may be predetermined by a user or administrator of the device or may be a default setting such that when the amount of change is greater than the perceived threshold quality, degradation may occur at the current frame rate or a slower frame rate at higher than an acceptable level to the user. However, if the amount of change is less than the perceived threshold, the frame rate may be reduced and the user will not experience quality degradation or will experience an acceptable level of degradation.

Thus, the maximum average normalized difference value may be compared to the perceived quality threshold and if the value is greater than the threshold, the frame rate may be increased and/or frame time may be decreased. However, if the maximum average normalized difference value is less than the perceived quality threshold, the frame rate may be decreased and/or frame time may be increased. In some embodiments, if the maximum average normalized difference value equals the perceived quality threshold, no change to the frame rate and/or frame time will occur.

The change in frame time (and frame rate) may occur as an increment or decrement in the frame time based on the above-recited analysis to determine a target frame time. The frame time may change by a unit of time such as a microsecond, millisecond, seconds, etc., and the amount of change may be configurable or set by a user or administrator. In some embodiments, the amount in change in frame time may be a default setting. As will be discussed in more detail below, the change may occur over a number frames and until the maximum average normalized difference values equals the perceived quality threshold and a target frame time is determined.

Figure 3:
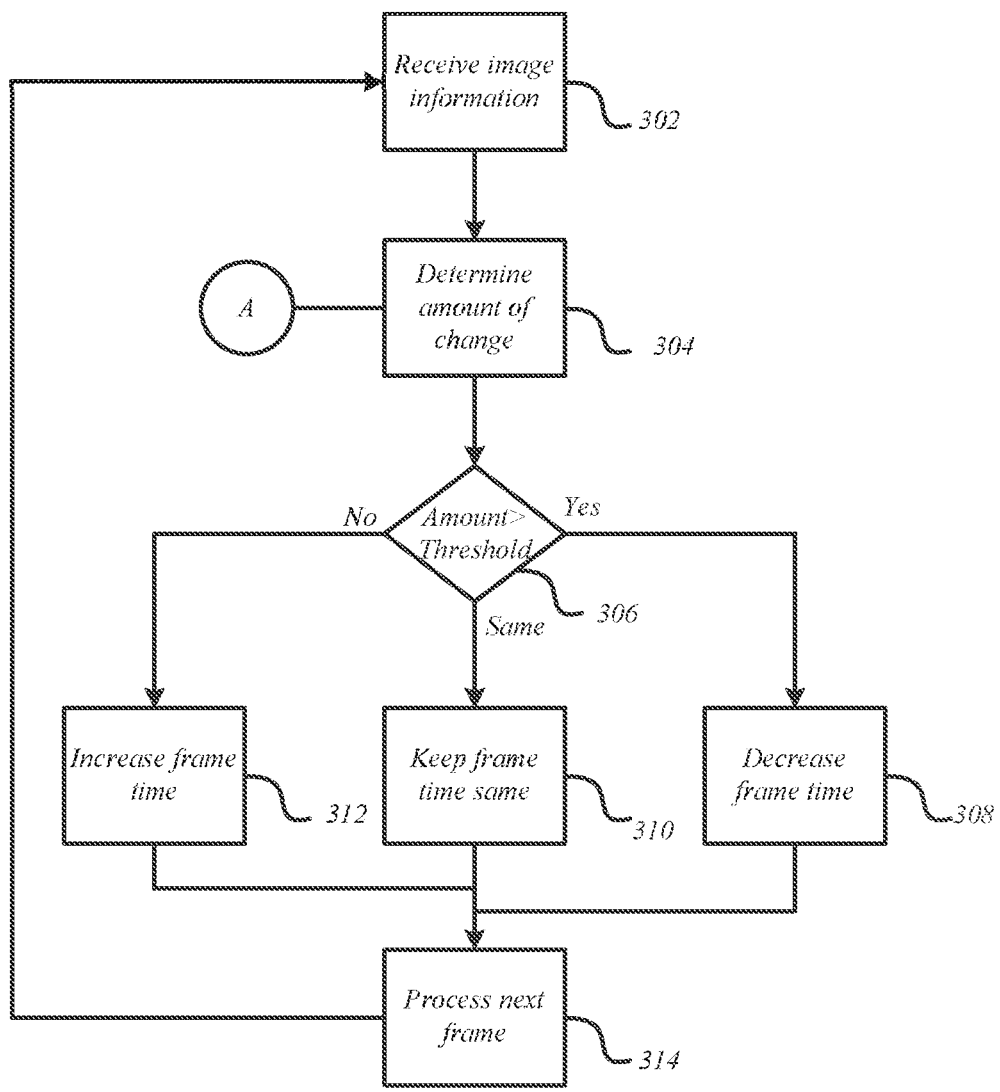
FIG. 3 illustrates an embodiment of a first logic flow diagram.

As will become apparent with respect to FIG. 3, the visual quality adjustment module 212 may use hysteresis values for both an increment value and a decrement value to "smooth" out the change in frame time and frame rate. In some embodiments, the visual quality adjustment module 212 may store and keep track of a down frame time hysteresis value and an up frame time hysteresis value and will only increase or decrease the target frame time once a corresponding hysteresis threshold value is reached and/or exceeded.

More specifically, when the maximum average difference value is greater than the perceived quality threshold, the down frame time hysteresis value is incremented until the value is greater than the down hysteresis threshold. Only after the down frame time hysteresis value is greater than the down hysteresis threshold will the target frame time be decreased (and frame rate increased). In addition, when the maximum average difference value is less than the perceived quality threshold, the up frame time hysteresis value is incremented until the value is greater than the up hysteresis threshold. Only after the up frame time hysteresis value is greater than the up hysteresis threshold will the target frame time be increased (and frame rate decreased).

The target frame time may be used by the graphics driver module 204 and GPU 206 to limit the frame rate which can be implemented by having the graphics driver module 204 delay a submission of new commands to the GPU 206 for processing graphics. In some embodiments, the GPU 206 operating frequency may be adjusted based on the determined target frame time.

In some embodiments, the visual quality adjustment module 212 may adjust other visual output parameters such as rendering parameters, resolution, color accuracy, and texture filtering. For example, the visual quality adjustment module 212 may identify that an amount of change between the current frame and the previous frame is large and decrease the rendering resolution without any degradation to a user experience. In other embodiments, the bits per channel for the color accuracy may be adjusted based on the amount of change between the current frame and the previous frame. Various embodiments are not limited in this manner, and other visual output parameters may be adjusted based on the amount of change.

FIG. 3 illustrates an embodiment of a first logic flow 300 for determining an adjustment for a visual output. For clarity purposes, the logic flow 300 is discussed with reference to system 100 and system 200 of FIGS. 1 and 2. At block 302, the visual quality metric module 210 may receive image information for a current frame from the GPU 206. The image information may include color information, hue information, vertex information, shader information, tessellation information, frame information, etc. for each of the pixels of the frame. The visual quality metric module 210 may then compare the image information of the current frame with image information of a previous frame to determine an amount of change between the current frame and the previous frame, at block 304. In some embodiments, the previous frame may be the frame that immediately preceding the current frame, however; various embodiments are not limited in this manner and the previous frame may be any previous frame of the current frame. Image information for each of the frames may be stored in memory or storage to use during the comparison between the current frame and the previous frame.

The visual quality metric module 210 may compare information based on the image information of the current frame with information based on the image information of a previous frame to determine an amount of change between the current frame and the previous frame. More specifically, the visual quality metric module 210 may determine luminance values for each pixel in each of the current frame and the previous frame and compare the luminance values to determine an amount of change. As will be discussed in more detail below with respect to FIG. 4, a maximum average normalized difference value may be determined from the luminance values and the maximum average normalized difference value may be compared to a perceived quality threshold to determine the adjustment.

At block 306 of logic flow 300, a determination is made as to whether the amount of change, represented by the maximum average normalized difference value, is greater than a perceived quality threshold by the visual quality adjustment module 212. If the maximum average normalized difference value is greater than the perceived quality threshold, a decrease in frame time (increase in frame rate) may be implemented at block 308. However, if the maximum average normalized difference value is less than the perceived quality threshold, an increase in frame time (decrease in frame rate) may be implemented at block 312. In addition, if the maximum average normalized difference value is equal to the perceived quality threshold, no change to the frame time and/or frame rate is implemented at block 310. Once an adjustment has been determine has been determined, the graphics processing system 200 may process the next frame utilizing the adjustment at block 314 and this process may be repeated for the next frame.

Figure 4:
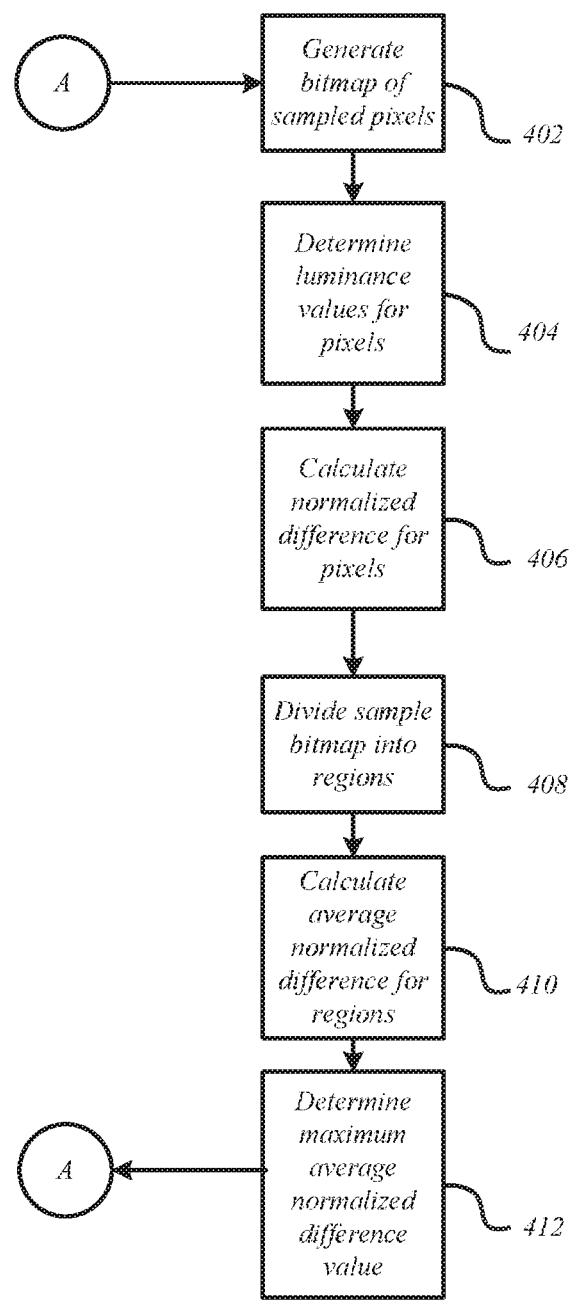
FIG. 4 illustrates an embodiment of a second logic flow diagram.

FIG. 4 illustrates an embodiment of a second logic flow 400 for determine an amount of change between frames. Logic flow 400 may be representative of the processing occurring in block 304 of FIG. 3 as indicated by indicator A. For clarity purposes, the logic flow 400 is discussed with reference to system 100 and system 200 of FIGS. 1 and 2.

At block 402, the visual quality metric module 210 may sample pixels of the bitmap received from the image information and use a subset of the pixels to determine an amount of change. For example, the visual quality metric module 210 may define a sample bitmap size of M×M regular grid and only select one pixel out of every M×M pixels from the original bitmap to generate a new bitmap. The resulting bitmap will be a grid with the size of W/M×H/M, wherein W is width of the original bitmap and H is the height of the original bitmap. Various embodiments are not limited to this example; the visual quality metric module 210 may select other sampling patterns such as sampling a particular area of the display.

The visual quality metric module 210 may then convert pixel color information into a luminance value for each of the pixels in the sampling or entire frame at block 404. For example, red, green, blue and alpha (RGBA) information for each of the pixels may be converted in to a luminance value or perceived brightness value. In some embodiments, the visual quality metric module 210 is not limited to converting RGBA information to luminance values and may convert all color channels to luminance values.

At block 406 of logic flow 400, the visual quality metric module 210 may calculate the normalized difference for each pixel of the sample selected above at block 402. More specifically, the visual quality metric module 210 may compare the luminance values for each pixel of the current frame with the luminance values for each pixel of the previous frame to determine a normalized difference between each pixel at the same location.

At block 408, the sampling bitmap may be divided into one or more regions and the normalized difference values for each pixel in a region may be used to determine an average normalized difference region value for each of the regions at block 410. Moreover, the maximum average normalized difference value based on the maximum average normalized difference region value at determined at block 412 for use in the comparison with the perceived quality threshold.

Figure 5:
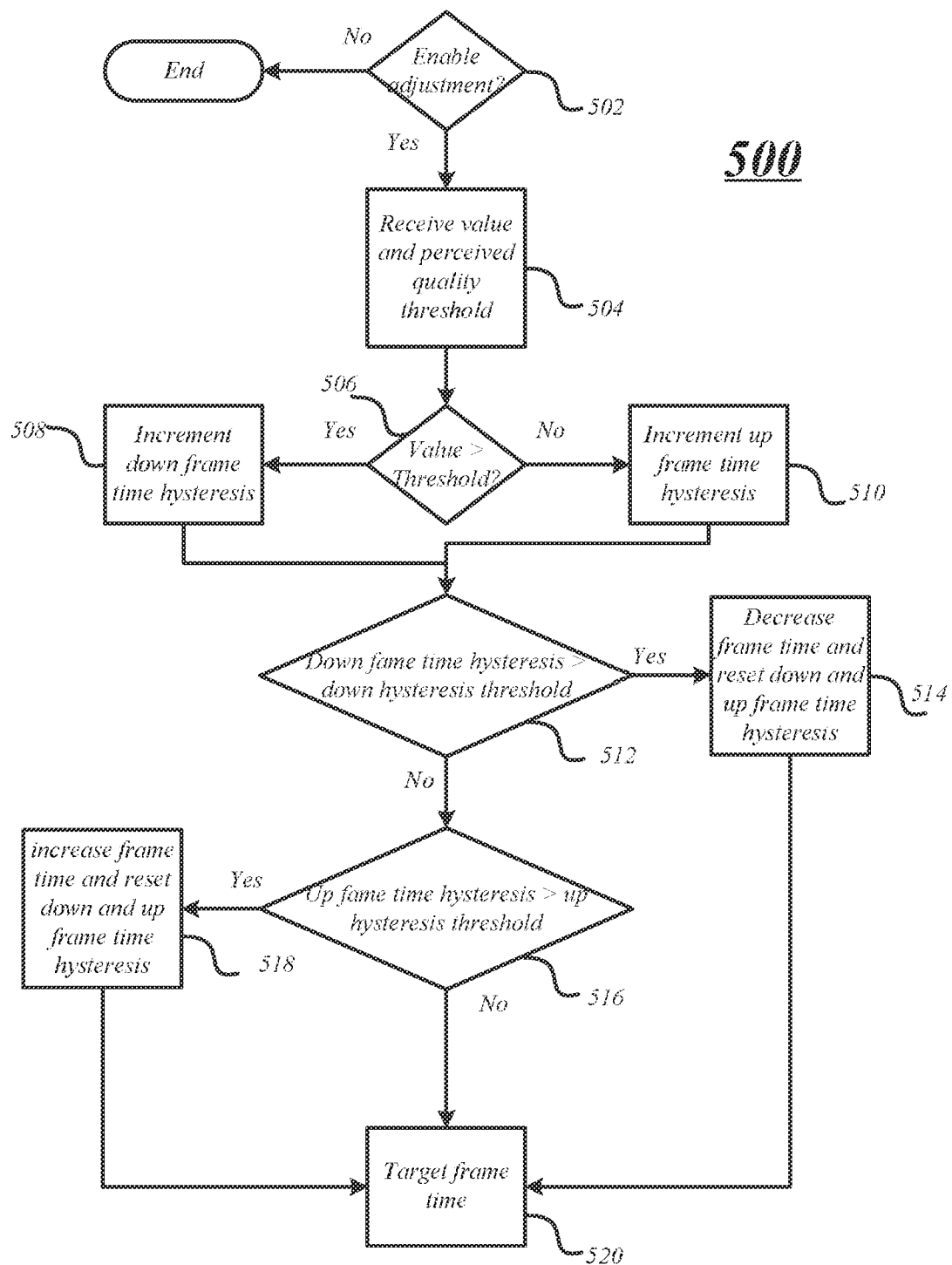
FIG. 5 illustrates an embodiment of a third logic flow diagram.

FIG. 5 illustrates an embodiment of a third logic flow 500 for adjusting a frame time and frame rate. For clarity purposes, the logic flow 400 is discussed with reference to system 100 and system 200 of FIGS. 1 and 2.

At block 502, the visual quality adjustment module 212 determines whether to enable or disable the adjustment to the frame time based on one or more criteria. The one or more criteria may include determining whether visual quality adjustment processing overhead is larger than an amount of savings in system power. This criterion may be based on graphics processing unit (GPU) utilization while processing visual quality adjustment being below a predetermined savings threshold. Another criterion may be determining whether the visual quality adjustment processing overhead will degrade overall system performance. This criterion may be based on the GPU utilization while processing the visual quality adjustment being above a performance threshold. A third criterion may be determining whether a power savings opportunity has occurred over a number of frames. For example, if no adjustment has been made over a number of predetermined frames, the visual quality adjustment module 212 may disable processing for a time period or a number of frames, as previous discussed. In a fourth criterion, the visual quality adjustment module 212 may determine if latency due to GPU utilization degrades the user experience. If the visual quality adjustment module 212 determines not to enable the adjustment process will end or pause for a time period or a number of frames.

If the adjustment is enabled, the visual quality adjustment module 212 receives the maximum average normalized difference value and perceived quality threshold at block 504. In various embodiments, the visual quality adjustment module 212 may receive the value and threshold before a determination is made as to enable or not enable the adjustment to the time frame. The visual quality adjustment module 212 may receive the maximum average normalized difference value from the visual quality metric module 210. The perceived quality threshold may be received from or retrieved from stored memory.

At decision block 506, the visual quality adjustment module 212 determines if the maximum average normalized difference value is greater than the perceived quality threshold. The visual quality adjustment module 212 increments an up frame time hysteresis value by one if the maximum average normalized difference value is greater than the perceived quality threshold at block 510. However, if the maximum average normalized difference value is less than the perceived quality threshold, the visual quality adjustment module 212 increments the down frame time hysteresis by one. The up frame time and down frame time hysteresis values are counters that ensure that an adjustment to the frame time and frame rate does not occur rapidly and cause undesired effects for the user.

At decision block 512, the visual quality adjustment module 212 determines if the down frame time hysteresis value is greater than the down hysteresis threshold. The down hysteresis threshold may be predetermined as a default value configured by a user and set such that a decrease in frame time does not adversely affect a user's experience. For example, the down hysteresis threshold may be set to three such that the down frame time hysteresis value must be incremented three times before a decrease in frame time is enacted ensuring that a change in frame time does not occur too rapidly. Various embodiments are not limited in this manner and the down hysteresis threshold may be set to any value. If the down frame time hysteresis value is greater than the down hysteresis, the visual quality adjustment module 212 may decrease the frame time by a unit of time such as a millisecond or second and reset the down frame time hysteresis value and the up frame time hysteresis value at block 514.

If at block 512 the visual quality adjustment module 212 determines that the down frame time hysteresis value is not greater than the down hysteresis threshold, the up frame time hysteresis value is compared to the up hysteresis threshold at block 516. The up hysteresis threshold may be predetermined as a default value of configured by a user and set such that an increase in frame time does not adversely affect a user's experience. For example, the up hysteresis threshold may be set to three such that the up frame time hysteresis value must be incremented three times before an increase in frame time is enacted ensuring that a change in frame time does not occur too rapidly. Various embodiments are not limited in this manner and the up hysteresis threshold may be set to any value. If the up frame time hysteresis value is greater than the up hysteresis threshold the visual quality adjustment module 212 may increase the frame time by a unit of time such as a millisecond or second and reset the down frame time hysteresis value and the up frame time hysteresis value.

If the up frame hysteresis value is not greater than the perceived value threshold, the visual quality adjustment module 212 does not change the frame time. At block 520, the target frame time is determined based on an increase, decrease or no change to the frame time at blocks 514, 516 and 518. The target frame time may be used by the graphics driver module 204 and GPU 206 to limit the frame rate which can be implemented by having the graphics driver module 204 delay a submission of new commands to the GPU 206 for processing graphics. In some embodiments, the GPU 206 operating frequency may be adjusted based on the determined target frame time.

Figure 6:
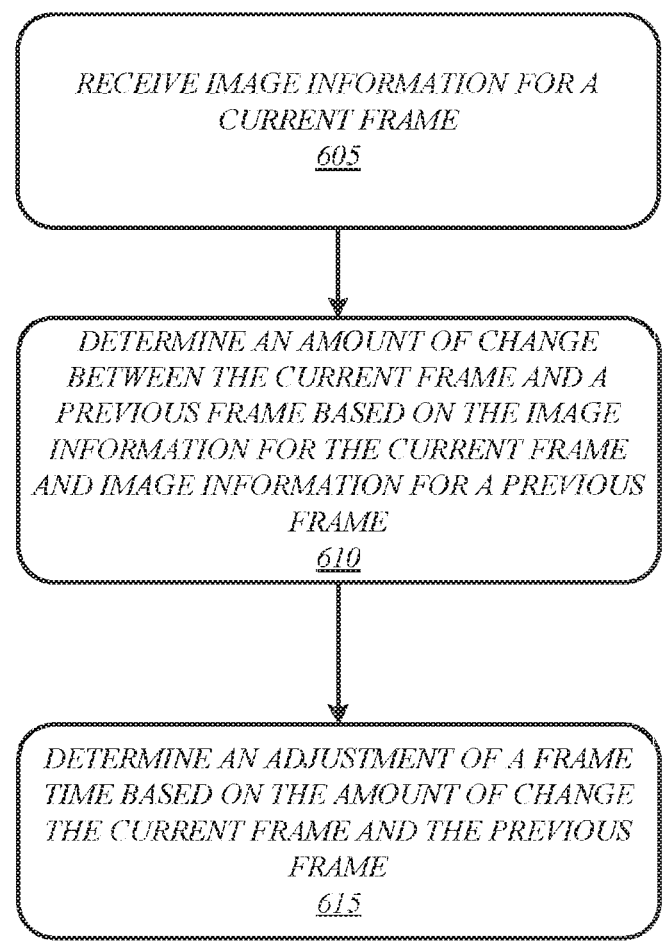
FIG. 6 illustrates an embodiment of a fourth logic flow diagram.

FIG. 6 illustrates an embodiment of a fourth logic flow 600. The logic flow 600 may be representative of some or all of the operations executed by one or more embodiments described herein. For example, the logic flow 600 may illustrate operations performed by the system 100 and system 200.

In the illustrated embodiment shown in FIG. 6, the logic flow 600 may include receiving image information for a current frame at block 605. More specifically, the visual quality metric module 210 may receive image information for a current frame from the GPU 206. The current frame may be the frame that is sent to the display subsystem 208 and display for presenting to a user. The image information may include image information may include a bitmap of pixels for displaying on a display and other information including pixel color information for each of the pixels for the frame.

At block 610, the logic flow 600 may include determining an amount of change between the current frame and a previous based on the image information for the current frame and image information for a previous frame. In some embodiment, luminance values for pixels of the current frame may be compared to luminance values for pixels of a previous frame to determine a normalized difference between each of the pixels being compared. The luminance values may be part of the image information or determined from pixel color information, as previously discussed.

The logic flow 600 may also include determining an adjustment of a frame time based on the amount of change between the current frame and the previous frame at block 615. More specifically, if the amount of change is greater than a perceived quality threshold, the frame rate may be decreased and/or a frame time may be increased. However, if the amount of change is less than the perceived quality threshold, the frame rate may be increased and/or the frame time may be decreased.

Figure 7:
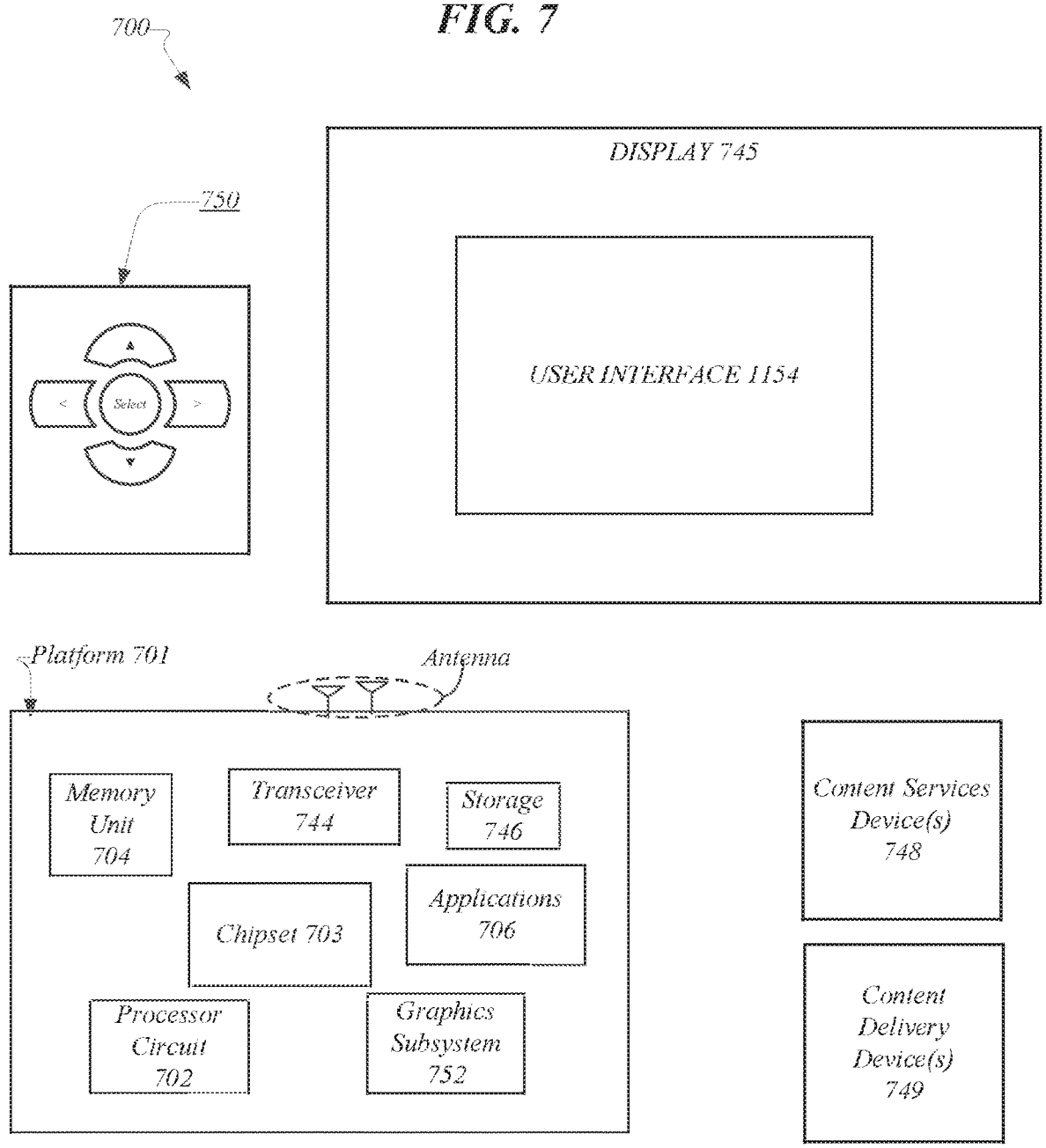
FIG. 7 illustrates an embodiment of a second computing system.

FIG. 7 illustrates an embodiment of a system 700. In various embodiments, system 1100 may be representative of a system or architecture suitable for use with one or more embodiments described herein, such as apparatus 100 and/or system 105 of FIG. 1, logic flow 200 of FIG. 2, logic flow 300 of FIG. 3, logic flow 400 of FIG. 4, logic flow 500 of FIG. 5 and logic flow 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 751, and/or graphics subsystem 752. For example, chipset 703 may include a storage adapter (not depicted) capable of providing intercommunication with storage 746.

Processor circuit 702 may be implemented using any processor or logic device, and may be the same as or similar to processor circuit 1002 in FIG. 10.

Memory unit 704 may be implemented using any machine-readable or computer-readable media capable of storing data, and may be the same as or similar to memory unit 1004 in FIG. 10.

Transceiver 744 may include one or more radios capable of transmitting and receiving signals using various suitable wireless communications techniques. Display 745 may include any television type monitor or display. Storage 746 may be implemented as a non-volatile storage device.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers.

In embodiments, platform 701 may receive control signals from navigation controller 750 having one or more navigation features. The navigation features of navigation controller 750 may be used to interact with a user interface 1154, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 1154. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
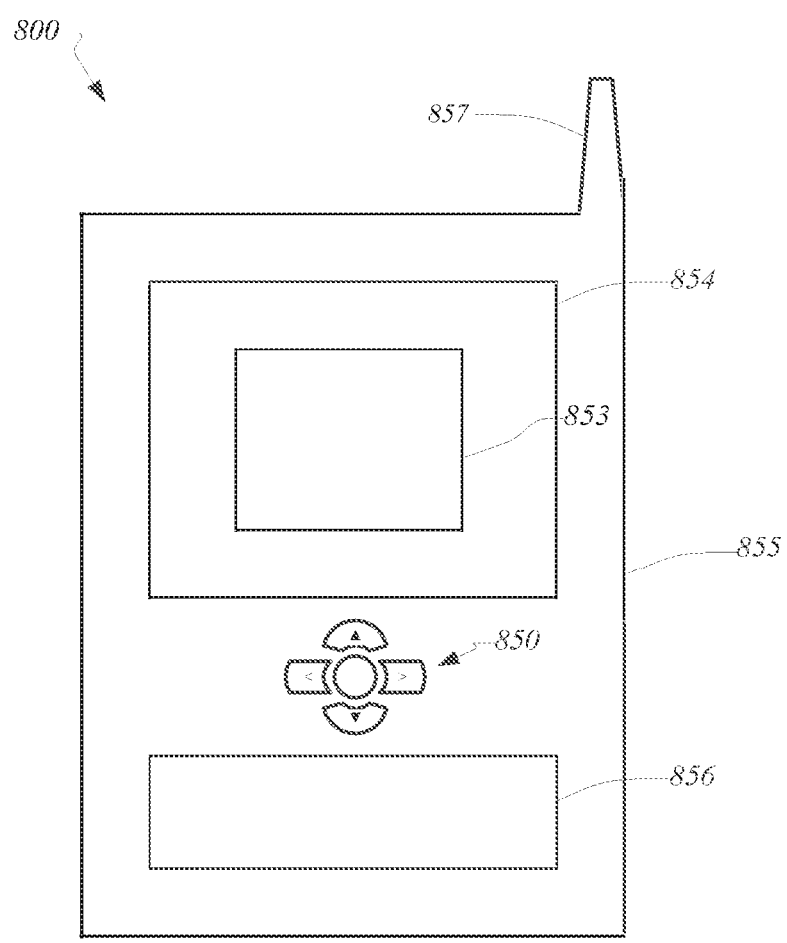
FIG. 8 illustrates an embodiment of a third computing system.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 850 in FIG. 8. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Figure 9:
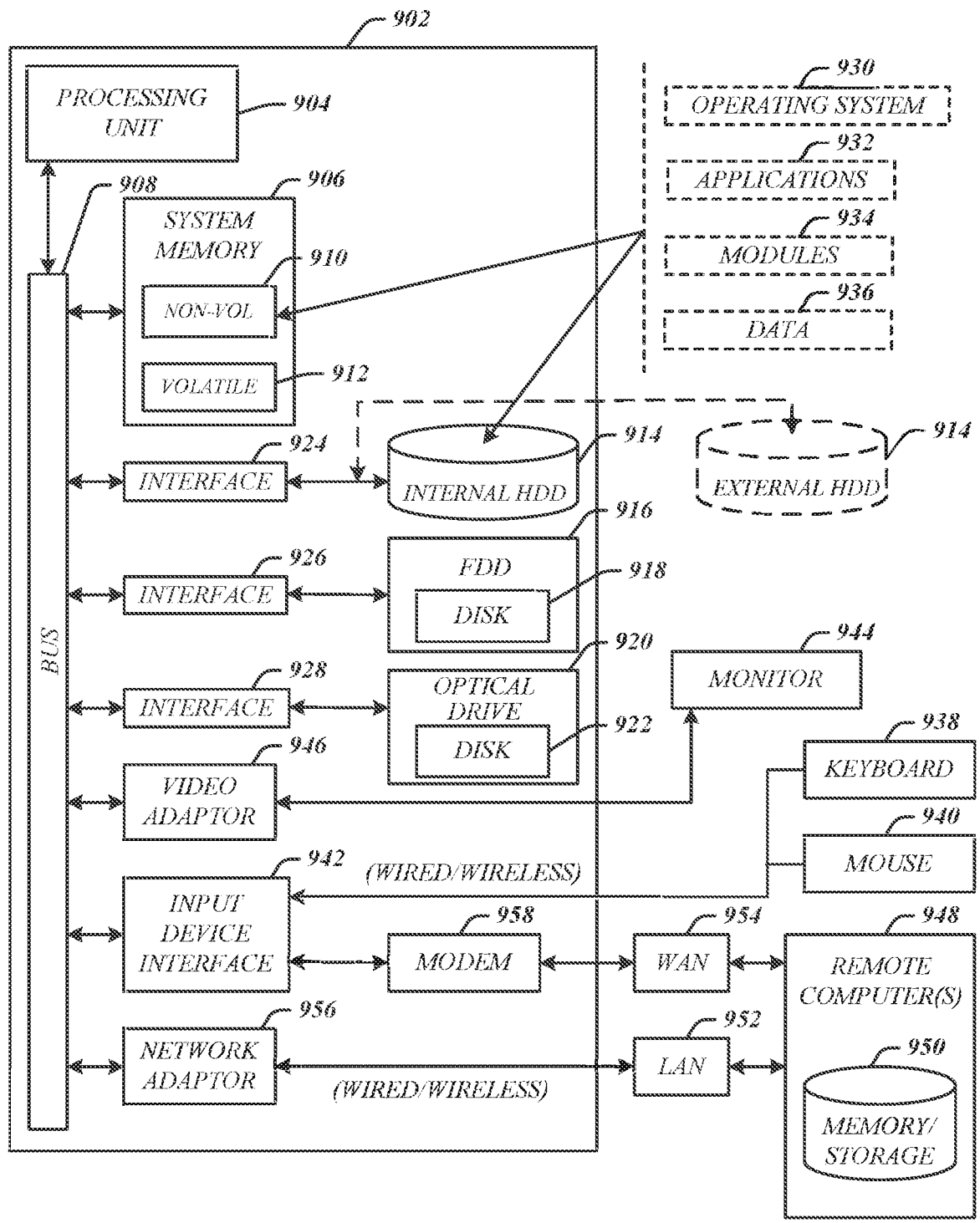
FIG. 9 illustrates an embodiment of a first computing architecture.

FIG. 9 illustrates an embodiment of an exemplary computing architecture 900 suitable for implementing various embodiments as previously described. In one embodiment, the computing architecture 900 may comprise or be implemented as part of computing device 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processing component 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing system 205 as previously described with reference to FIGS. 1-9 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, an apparatus or computing device may include processing circuitry, a visual quality metric module for execution on the processing circuitry to receive image information for a current frame and determine an amount of change between the current frame and a previous frame based on the image information for the current frame and image information for the previous frame and a visual quality adjustment module for execution on the processing circuitry to determine an adjustment of a frame time based on the amount of change between the current frame and the previous frame.

In a second example and in furtherance of the first example, the adjustment may include a decrease in the frame time when the amount of change based the image information for the current frame and the image information for the previous frame is greater than a perceived quality threshold, an increase in the frame time when the amount of change based the image information for the current frame and the image information for the previous is less than to the perceived quality threshold and no change in the frame time when there is no change based on the image information for the current frame and the image information for the previous frame.

In a third example and in furtherance of any of the previous examples, the apparatus or computing device may include the visual quality metric module to determine the amount of change based on a comparison between pixels of the current frame with pixels of the previous frame, wherein the pixels of the current frame are at corresponding locations of the pixels of the previous frame.

In a fourth example and in furtherance of any of the previous examples, the apparatus or computing device including the image information comprising pixel color information and the visual quality metric module to compare pixel color information for each pixel of the current frame with corresponding pixel color information for each pixel of the previous frame to determine the amount of change.

In a fifth example and in furtherance of any of the previous examples, the apparatus or computing device including the image information comprising pixel color information and the visual quality metric module to determine luminance values for each of the pixels from pixel color information for each pixel.

In a sixth example and in furtherance of any of the previous examples, the apparatus or computing device including the comparison comprising comparing the luminance value for each of the pixels of the current frame with a luminance value for each of the pixels of the previous frame at the corresponding location and the visual quality metric module to generate a bitmap of normalized difference values for each of the corresponding locations.

In a seventh example and in furtherance of any of the previous examples, the apparatus or computing device may include the visual quality metric module to divide the bitmap into one or more regions and calculate an average normalized difference value for each of the one or more regions based on the normalized difference values in each of the one or more regions.

In an eighth example and in furtherance of any of the previous examples, the apparatus or computing device may include wherein the amount of change comprises a maximum average normalized difference value for the bitmap based on the average normalized difference values for each of the one or more regions and the visual quality adjustment module to determine the adjustment based on a comparison between the maximum average normalized difference value and a perceived quality threshold.

In an ninth example and in furtherance of any of the previous examples, the apparatus or computing device may include the visual quality adjustment module to prevent the adjustment based on one or more criteria comprising graphics processing overhead greater than potential power savings, graphics processing overhead degrades graphics processing performance, the adjustment will not save power and the adjustment will degrade user experience below a defined threshold.

In a tenth example and in furtherance of any of the previous examples, an article may include the computer-readable storage medium containing the plurality of instructions that when executed enable a processing circuit to receive image information for a current frame, determine an amount of change between the current frame and a previous frame based on the image information for the current frame and image information for the previous frame; and determine an adjustment of a frame time based on the amount of change the current frame and the previous frame.

In a eleventh example and in furtherance of any of the previous examples, an article may include the computer-readable storage medium containing the plurality of instructions that when executed enable a processing circuit to decrease the frame time when the amount of change based the image information for the current frame and the image information for the previous frame is greater than a perceived quality threshold, increase the frame time when the amount of change based on the image information for the current frame and the image information for the previous is less than the perceived quality threshold, and not change the frame time when there is no change based on the image information for the current frame and the image information for the previous frame.

In an twelfth example and in furtherance of any of the previous examples, an article may include the computer-readable storage medium containing the plurality of instructions that when executed enable a processing circuit to determine the amount of change based on a comparison between pixels of the current frame with pixels of a previous frame, wherein the pixels of the current frame are at corresponding locations of the pixels of the previous frame.

In a thirteenth example and in furtherance of any of the previous examples, the image information comprising pixel color information and the article comprising instructions that when executed enable the processing circuit to compare pixel color information for pixels of the current frame with corresponding pixel color information for pixels of the previous frame to determine the amount of change.

In a fourteenth example and in furtherance of any of the previous examples, the image information comprising pixel color information and the article comprising instructions to determine luminance values for each of the pixels from pixel color information for each pixel.

In a fifteenth example and in furtherance of any of the previous examples, an article may include the computer-readable storage medium containing the plurality of instructions that when executed enable a processing circuit to compare the luminance value for each of the pixels of the current frame with a luminance value for each of the pixels of the previous frame at the corresponding location and generate a bitmap of normalized difference values for each of the corresponding locations.

In a sixteenth example and in furtherance of any of the previous examples, an article may include the computer-readable storage medium containing the plurality of instructions that when executed enable a processing circuit to divide the bitmap into one or more regions and calculate an average normalized difference value for each of the one or more regions based on the normalized difference values in each of the one or more regions.

In a seventeenth example and in furtherance of any of the previous examples, the amount of change comprising a maximum average normalized difference value for the bitmap based on the average normalize difference values for each of the one or more regions and the article comprising instructions that when executed enable the processing circuit to determine the adjustment based on a comparison between the maximum average normalized difference value and a perceived quality threshold.

In a eighteenth example and in furtherance of any of the previous examples, a computer-implemented method may include receiving image information for a current frame, determining an amount of change between the current frame and a previous based on the image information for the current frame and image information for the previous frame and determining an adjustment of a frame time based on the amount of change between the current frame and the previous frame.

In an nineteenth example and in furtherance of any of the previous examples, a computer-implemented method may include decreasing the frame time when the amount of change based on the image information for the current frame and the image information for the previous frame is greater than a perceived quality threshold, increasing the frame time when the amount of change based on the image information for the current frame and the image information for the previous is less than the perceived quality threshold and not changing the frame time when there is no change based on the image information for the current frame and the image information for the previous frame.

In a twentieth example and in furtherance of any of the previous examples, a computer-implemented method may include determining the amount of change based on a comparison between pixels of the current frame with pixels of a previous frame, wherein the pixels of the current frame are at corresponding locations of the pixels of the previous frame.

In a twenty-first example and in furtherance of any of the previous examples, a computer-implemented method may include, the image information comprising pixel color information and comparing pixel color information for each pixel of the current frame with corresponding pixel color information for each pixel of the previous frame to determine the amount of change.

In a twenty-second example and in furtherance of any of the previous examples, a computer-implemented method may include the image information comprising pixel color information and determining luminance values for each of the pixels from pixel color information for each pixel.

In a twenty-third example and in furtherance of any of the previous examples, a computer-implemented method may include comparing a luminance value for each of the pixels of the current frame with a luminance value for each of the pixels of the previous frame at the corresponding location and generating a bitmap of normalized difference values for each of the corresponding locations.

In a twenty-fourth example and in furtherance of any of the previous examples, a computer-implemented method may include dividing the bitmap into one or more regions and calculating an average normalized difference value for each of the one or more regions based on the normalized difference values in each of the one or more regions.

In a twenty-fifth example and in furtherance of any of the previous examples, a computer-implemented method may include the amount of change comprising a maximum average normalized difference value for the bitmap based on the average normalize difference values for each of the one or more regions and determining the adjustment based on a comparison between the maximum average normalized difference value and a perceived quality threshold.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    memory; and
    processing circuitry coupled with the memory, the processing circuitry to determine an amount of change between a current frame and a previous frame based on image information for the current frame and image information for the previous frame; compare the amount of change to a perceived quality threshold to adjust a hysteresis value; compare the hysteresis value to a hysteresis threshold to determine an adjustment of a frame time, wherein the frame time is an amount of time to process one frame; and adjust the frame time based on the adjustment, in response to the hysteresis value exceeding the hysteresis threshold.

2. The apparatus of claim 1, the adjustment comprising:
    a decrease in the frame time in response to a first hysteresis value exceeding a first threshold and
    an increase in the frame time in response to a second hysteresis value exceeding a second threshold, wherein the hysteresis value comprises the first hysteresis value and second hysteresis value and wherein the hysteresis threshold comprises the first hysteresis threshold and second hysteresis threshold, the first hysteresis value and second hysteresis value to be reset in response to the adjustment of the frame time.

3. The apparatus of claim 1, the processing circuitry to determine the amount of change based on a comparison between pixels of the current frame with pixels of the previous frame, wherein the pixels of the current frame are at corresponding locations of the pixels of the previous frame.

4. The apparatus of claim 3, the image information comprising pixel color information and the processing circuitry to compare pixel color information for each pixel of the current frame with corresponding pixel color information for each pixel of the previous frame to determine the amount of change.

5. The apparatus of claim 3, the image information comprising pixel color information and the processing circuitry to determine luminance values for each of the pixels from pixel color information for each pixel.

6. The apparatus of claim 5, wherein comparison of pixel color information comprises comparing the luminance value for each of the pixels of the current frame with a luminance value for each of the pixels of the previous frame at the corresponding location, and
    the processing circuitry to generate a bitmap of normalized difference values for each of the corresponding locations.

7. The apparatus of claim 6, the processing circuitry to divide the bitmap into one or more regions and calculate an average normalized difference value for each of the one or more regions based on the normalized difference values in each of the one or more regions.

8. The apparatus of claim 7, wherein the amount of change comprises a maximum average normalized difference value for the bitmap based on the average normalized difference values for each of the one or more regions, and the processing circuitry to determine the adjustment based on a comparison between the maximum average normalized difference value and a perceived quality threshold.

9. The apparatus of claim 1, the processing circuitry to prevent the adjustment based on one or more criteria comprising graphics processing overhead greater than potential power savings, graphics processing overhead degrades graphics processing performance, the adjustment will not save power and the adjustment will degrade user experience below a defined latency threshold.

10. An article comprising a computer-readable storage medium containing a plurality of instructions that, when executed, enable a processing circuit to:
    determine an amount of change between a current frame and a previous frame based on image information for the current frame and image information for the previous frame; compare the amount of change to a perceived quality threshold to adjust a hysteresis value; compare the hysteresis value to a hysteresis threshold to determine an adjustment of a frame time, wherein the frame time is an amount of time to process one frame; and adjust the frame time based on the adjustment, in response to the hysteresis value exceeding the hysteresis threshold.

11. The article of claim 10, comprising instructions that when executed enable the processing circuit to:
    decrease in the frame time in response to a first hysteresis value exceeding a first threshold and
    increase in the frame time in response to a second hysteresis value exceeding a second threshold, wherein the hysteresis value comprises the first hysteresis value and second hysteresis value and wherein the hysteresis threshold comprises the first hysteresis threshold and second hysteresis threshold, the first hysteresis value and second hysteresis value to be reset in response to the adjustment of the frame time.

12. The article of claim 10, comprising instructions that when executed enable the processing circuit to determine the amount of change based on a comparison between pixels of the current frame with pixels of a previous frame, wherein the pixels of the current frame are at corresponding locations of the pixels of the previous frame.

13. The article of claim 12, the image information comprising pixel color information and the article comprising instructions that when executed enable the processing circuit to compare pixel color information for pixels of the current frame with corresponding pixel color information for pixels of the previous frame to determine the amount of change.

14. The article of claim 12, the image information comprising pixel color information and the article comprising instructions to determine luminance values for each of the pixels from pixel color information for each pixel.

15. The article of claim 14, comprising instructions that when executed enable the processing circuit to compare the luminance value for each of the pixels of the current frame with a luminance value for each of the pixels of the previous frame at the corresponding location; and
    generate a bitmap of normalized difference values for each of the corresponding locations.

16. The article of claim 15, comprising instructions that when executed enable the processing circuit to:
    divide the bitmap into one or more regions; and
    calculate an average normalized difference value for each of the one or more regions based on the normalized difference values in each of the one or more regions.

17. The article of claim 16, the amount of change comprising a maximum average normalized difference value for the bitmap based on the average normalize difference values for each of the one or more regions, wherein the article comprises instructions that when executed enable the processing circuit to determine the adjustment based on a comparison between the maximum average normalized difference value and a perceived quality threshold.

18. A method, comprising:
    determining, by processing circuitry, an amount of change between a current frame and a previous frame based on image information for the current frame and image information for the previous frame;
    comparing, by processing circuitry, the amount of change to a perceived quality threshold to adjust a hysteresis value;
    comparing, by processing circuitry, the hysteresis value to a hysteresis threshold to determine an adjustment of a frame time, wherein the frame time is an amount of time to process one frame; and
    adjusting, by processing circuitry, the frame time based on the adjustment, in response to the hysteresis value exceeding the hysteresis threshold.

19. The method of claim 18, comprising:
    decreasing in the frame time in response to a first hysteresis value exceeding a first threshold and
    increasing in the frame time in response to a second hysteresis value exceeding a second threshold, wherein the hysteresis value comprises the first hysteresis value and second hysteresis value and wherein the hysteresis threshold comprises the first hysteresis threshold and second hysteresis threshold, the first hysteresis value and second hysteresis value to be reset in response to the adjustment of the frame time.

20. The method of claim 18, comprising:
    determining the amount of change based on a comparison between pixels of the current frame with pixels of a previous frame, wherein the pixels of the current frame are at corresponding locations of the pixels of the previous frame.

21. The method of claim 20, the image information comprising pixel color information; and
    comparing pixel color information for each pixel of the current frame with corresponding pixel color information for each pixel of the previous frame to determine the amount of change.

22. The method of claim 20, the image information comprising pixel color information; and
    determining luminance values for each of the pixels from pixel color information for each pixel.

23. The method of claim 22, comprising:
    comparing a luminance value for each of the pixels of the current frame with a luminance value for each of the pixels of the previous frame at the corresponding location; and
    generating a bitmap of normalized difference values for each of the corresponding locations.

24. The method of claim 23, comprising:
    dividing the bitmap into one or more regions; and
    calculating an average normalized difference value for each of the one or more regions based on the normalized difference values in each of the one or more regions.

25. The method of claim 23, the amount of change comprising a maximum average normalized difference value for the bitmap based on the average normalize difference values for each of the one or more regions, wherein the method comprises determining the adjustment based on a comparison between the maximum average normalized difference value and a perceived quality threshold.

* * * * *